3,786,047
METHINE DYESTUFFS
Hans-Peter Kuhlthau, Leverkusen, Germany, assignor to
 Bayer Aktiengesellschaft, Leverkusen, Germany
No Drawing. Filed Aug. 17, 1971, Ser. No. 172,585
Claims priority, application Germany, Aug. 17, 1970,
P 20 40 653.5
Int. Cl. C09b 23/00
U.S. Cl. 260—240.8                17 Claims

ABSTRACT OF THE DISCLOSURE

Methine dyestuffs, processes for their manufacture and their use for dyeing and printing of polyacrylnitrile, copolymers of acrylnitrile with other vinyl compounds, acid modified aromatic polyesters, acid modified polyamides, leather, tanned cotton, cellulose, polyurethanes and for the production of writing liquids and stamping inks.

---

The subject-matter of the invention comprises new methine dyestuffs of the formula

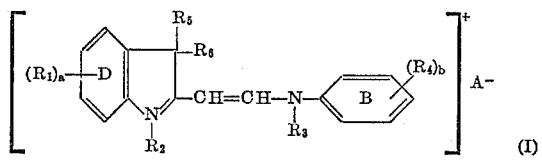

in which $R_1$ stands for halogen, lower alkyl, cycloalkyl, aralkyl, alkoxy, nitro, carbalkoxy, cyano, acyl, acylamino, amino, carbamoyl, N-alkyl-carbamoyl, N,N-dialkylcarbamoyl, N-alkyl-N-aryl-carbamoyl, sulphamoyl, N-alkyl-sulphamoyl, N,N - dialkyl - sulphamoyl, alkyl-sulphonyl, arylsulphonyl, trifluoromethyl, or for aryloxy, aralkoxy, carboxylic acid aralkyl ester, carboxylic acid aryl ester, or for aryloxy-alkyl;

$R_4$ stands for halogen, lower alkyl, cycloalkyl, aralkyl, alkoxy, nitro, carbalkoxy, cyano, acyl, acylamino, amino, carbamoyl, N-alkyl-carbamoyl, N,N-dialkylcarbamoyl, N-alkyl-N-aryl-carbamoyl, sulphamoyl, N-alkyl-sulphamoyl, N,N - dialkyl - sulphamoy, alkyl-sulphonyl, arylsulphonyl, trifluoromethyl, or for aryloxy, aralkoxy, carboxylic acid aralkyl ester, carboxylic acid aryl ester, or for aryloxy-alkyl, and at least one of the substituents $R_1$ and $R_4$ represents aryloxy, aralkoxy, carboxylic acid aralkyl ester, carboxylic acid aryl ester or aryloxy-alkyl;

$R_2$ stands for hydrogen, lower alkyl, cycloalkyl, aralkyl or aryl;

$R_3$ stands for hydrogen or lower alkyl which may close a 5- or 6-membered ring in a position adjacent to the aryl ring B; the heterocyclic 5- or 6-membered ring thus formed may be alkyl-substituted or fused with a further carbocyclic ring;

$R_5$ stands for lower alkyl, aralkyl or cycloalkyl;

$R_6$ stands for lower alkyl, aralkyl or cycloalkyl;

$a$ stands for the numbers 0, 1, 2 or 3;

$b$ stands for the numbers 0, 1, 2 or 3; and $A^-$ stands for an anion; and in which the rings B and D may be fused with carbocyclic rings, and the aromatic carbocyclic rings of the dyestuff may contain further non-ionic substituents, such as e.g. chlorine, bromine, fluorine atoms or ethyl, methyl, methoxy, carbomethoxy, nitro or nitrile groups.

The invention also relates to processes for the production of the dyestuffs and for their use for dyeing and printing.

Aryloxy, aralkoxy, carboxylic acid aralkyl esters, carboxylic acid aryl esters and aryloxy-alkyl may be substituted in the aromatic radical, particularly by lower alkyl, halogen, lower alkoxy, carbalkoxy, cyano, nitro and/or hydroxy.

Suitable lower alkyl radicals are, for example: methyl, ethyl, n-propyl, iso-propyl, n-butyl, iso-butyl, tert.-butyl and iso-amyl.

Alkylsulphonyl stands, for example, for methyl- or ethyl-sulphonyl; arylsulphonyl stands e.g. for phenyl-sulphonyl. Halogen stands for fluorine, chlorine or bromine.

Lower alkoxy stands, for example, for methoxy, ethoxy, n-propoxy, iso-propoxy and n-butoxy. Alkoxy stands for lower alkoxy and for larger radicals, such as e.g. dodecyloxy.

Carbalkoxy stands primarily for carbomethoxy, carboethoxy, carbopropoxy and carbobutoxy.

Suitable acyl radicals are primarily acetyl, propionyl, toluyl and benzoyl.

Suitable acylamino radicals are, for example, formylamino, acetylamino, n-propionylamino, benzoylamino, 4-chlorobenzoylamino and 4-methyl-benzoylamino.

Suitable aralkyl radicals are, for example: phenylmethyl, β-phenylethyl, phenylpropyl-(2,2) and possibly the derivatives thereof substituted in the phenyl nucleus.

Cyclohexyl is especially important as cycloalkyl.

Aryl stands for carbocyclic aromatic hydrocarbons with 6–10 carbon atoms, such as phenyl and naphthyl and their derivatives, such as 4-methylphenyl, 2-methylphenyl, 4-chlorophenyl, 2-chlorophenyl and 2-methyl-4-chlorophenyl.

N-alkyl-carbamoyl and N,N-dialkyl-carbamoyl stand, for example, for methyl-carbamoyl, N-ethyl-carbamoyl, N-n-butyl carbamoyl, N,N-dimethyl-carbamoyl, N,N-diethyl-carbamoyl and N-methyl-N-ethyl-carbamoyl.

N-alkyl-N-aryl-carbamoyl stands, for example, for N-methyl - N - phenyl-carbamoyl and N-ethyl-N-phenyl-carbamoyl.

N-alkyl-sulphamoyl and N,N-dialkyl-sulphamoyl stand, for example, for N-methyl-sulphamoyl, N-ethyl-sulphamoyl, N,N-dimethyl-sulphamoyl and N,N-diethyl-sulphamoyl.

Suitable aryloxy radicals are, for example: phenoxy and naphthoxy and their derivatives substituted in the aromatic ring. Suitable aralkoxy radicals are, for example, phenylmethyloxy, phenylethyloxy, phenylpropyl-(2,2)-oxy and possibly the derivatives thereof substituted in the phenyl nucleus. Carboxylic acid aralkyl ester substituents are, for example, carbobenzoxy, carbo-α-phenylethyloxy, carbo-β-phenylethyloxy, carbo-γ-phenyl-n-propyloxy and the derivatives thereof substituted in the phenyl nucleus. A carboxylic acid aralkyl ester is e.g. the carboxylic acid phenyl ester. An aryloxy-alkyl substituent is, for example, the phenoxymethyl radical which may be substituted in the phenyl nucleus.

Suitable anionic radicals $A^-$ are the organic and inorganic anions customary in basic dyestuffs; examples are: chloride, bromide, iodide, carbonate, bicarbonate, $CH_3SO_4^-$, $C_2H_5SO_4^-$, p-toluene-sulphonate, $HSO_4^-$, $SO_4^{--}$, disulphate, aminosulphonate, methane-sulphonate, benzene-sulphonate, p-chlorobenzene-sulphonate, dihydrogen phosphate, phosphate, phosphomolybdate, phosphotungstomolybdate, acetate, chloroacetate, formate, propionate, lactate, crotonate, benzoate, $NO_3^-$, perchlorate, $ZnCl_3^-$, the anions of saturated or unsaturated aliphatic dicarboxylic acids such as malonic acid, maleic acid, citric acid, tartaric acid, oxalic acid, itaconic acid, succinic acid, glutaric acid, adipic acid, pimelic acid and suberic acid, as well as the anions of other organic mono-basic acids with 4–30 carbon atoms. Colorless anions are preferred; for dyeing from an aqueous medium those anions are preferred which do not too strongly impair the water-solubility of the dyestuff. For dyeing from organic solvents, those anions are also preferred in many cases, which further the solubility of the dyestuff in organic solvents or, at least, do not adversely affect it.

A preferred group within the dyestuffs according to the invention are those of the general formula

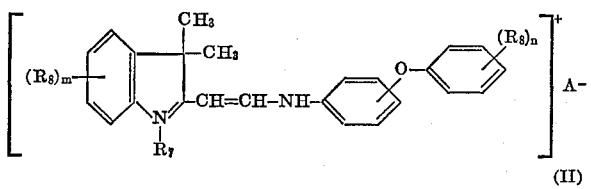

in which $R_7$ stands for methyl, ethyl or benzyl;
$R_8$ stands for identical or different methyl, ethyl, tert.-butyl, cyclohexyl, hydroxy, methoxy, ethoxy, acetylamino, nitro groups or for chlorine atoms;
$R_9$ stands for identical or different methyl, ethyl, cyclohexyl, methoxy, ethoxy, dodecyloxy, acetylamino, nitro, carbomethoxy, carboethoxy, carbamoyl, N-methyl-N-phenyl-carbamoyl, N-ethyl-N-phenyl-carbamoyl, sulphamoyl, methylsulphonyl, phenylsulphonyl, cyano, trifluoromethyl groups, chlorine, bromine and/or fluorine atoms;
$m$ stands for the numbers 0, 1, 2 or 3;
$n$ stands for the numbers 0, 1, 2 or 3; and
$A^-$ stands for an anion.

Another preferred group within the dyestuffs according to the invention has the General Formula III

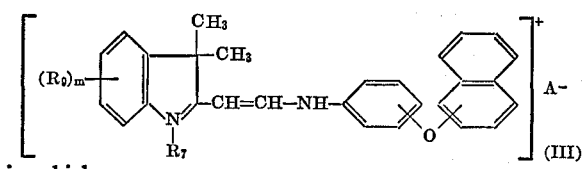

in which $R_7$, $R_9$, $m$ and $A^-$ have the same meaning as above.

A further preferred group within the dyestuffs according to the invention has the General Formula IV

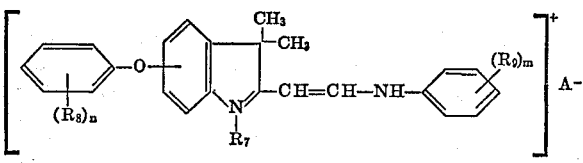

in which $R_7$, $R_8$, $R_9$, $m$, $n$ and $A^-$ have the same meaning as above.

Further preferred dyestuffs are those of the General Formula V

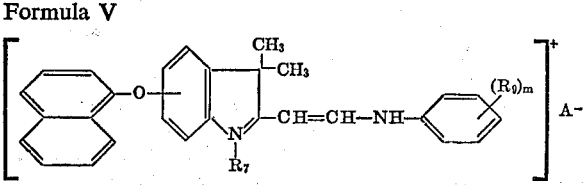

in which $R_7$, $R_9$, $m$ and $A^-$ have the same meaning as above.
Preferred dyestuffs are also those of the General Formula VI

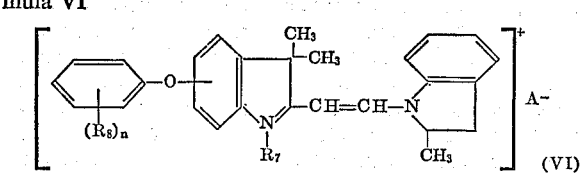

in which $R_7$, $R_8$, $n$ and $A^-$ have the same meaning as above.

Preferred dyestuffs are also those of the General Formula VII

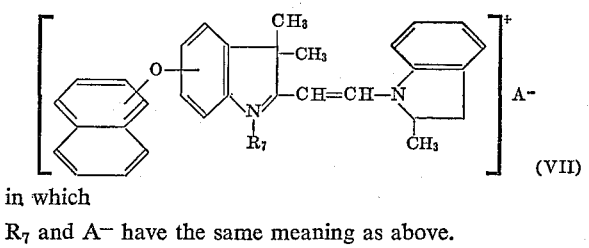

in which $R_7$ and $A^-$ have the same meaning as above.

Particularly preferred dyestuffs according to the invention are those of the following general formula:

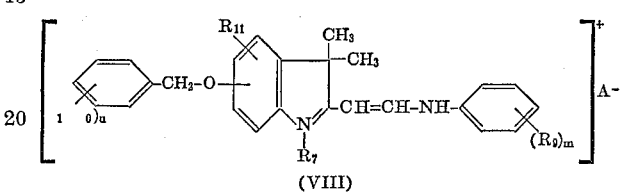

in which $R_7$, $R_9$, $m$ and $A^-$ have the same meaning as above;
$R_{10}$ means identical or different methyl and/or chlorine substituents;
$R_{11}$ means hydrogen, methyl, ethyl, methoxy, ethoxy or chlorine; and
$u$ means the numbers 0, 1, 2 or 3.

Dyestuffs according to the invention of particular importance are those of the General Formula IX

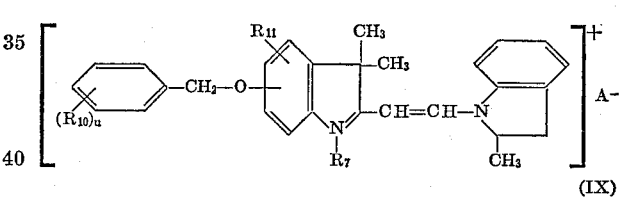

in which $R_7$, $R_{10}$, $R_{11}$, $u$ and $A^-$ have the same meaning as above.

A further group within the dyestuffs according to the invention which is particularly preferred comprises those of the General Formula X

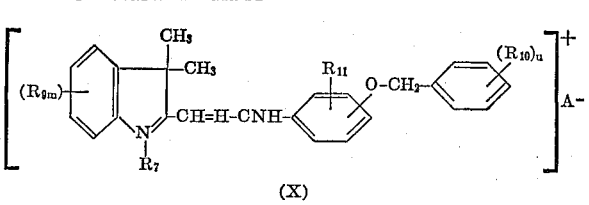

in which $R_7$, $R_9$, $R_{10}$, $R_{11}$, $m$, $u$ and $A^-$ have the same meaning as above.

Preferred methine dyestuffs according to the invention are also those of the General Formula XI

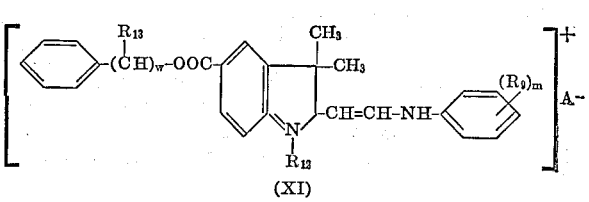

in which $m$, $R_9$, and $A^-$ have the same meaning as above;
$R_{12}$ means methyl or ethyl;
$R_{13}$ means hydrogen or methyl; and
$w$ means the numbers 1, 2 or 3.

Finally, dyestuffs of the General Formula XII

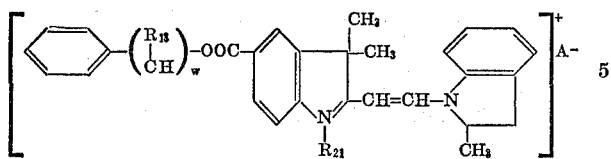

in which $R_{12}$, $R_{13}$, $A^-$ and $w$ have the same meaning as above, are likewise preferred.

The dyestuffs according to the invention are of particular importance for the dyeing from chlorinated hydrocarbons when the anion $A^-$ in the Formulae II to XII is the anion of a monobasic organic acid with 4–30 carbon atoms.

The dyestuffs of the general formula

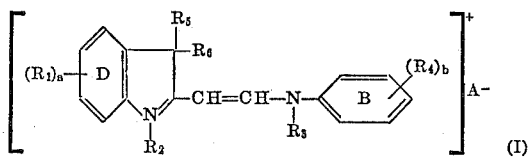

in which $R_1$ stands for halogen, lower alkyl, cycloalkyl, aralkyl, alkoxy, nitro, carbalkoxy, cyano, acyl, acylamino, amino, carbamoyl, N-alkyl-carbamoyl, N,N-dialkylcarbamoyl, N-alkyl-N-aryl-carbamoyl, sulphamoyl, N-alkylsulphamoyl, N,N-dialkyl-sulphamoyl, alkylsulphonyl arylsulphonyl, trifluoromethyl, or for aryloxy, aralkoxy, carboxylic acid aryl ester, carboxylic acid aralkyl ester, or for aryloxyalkyl;

$R_4$ stands for halogen, lower alkyl, cycloalkyl, aralkyl, alkoxy, nitro, carbalkoxy, cyano, acyl, acylamino, amino, carbamoyl, N-alkyl-carbamoyl, N,N-dialkyl-carbamoyl, N-alkyl-N-arylcarbamoyl, sulphamoyl, N-alkylsulphamoyl, N,N - dialkylsulphamoyl, alkylsulphonyl, aryl sulphonyl, trifluoromethyl, or for aryloxy, aralkoxy, carboxylic acid aralkyl ester, carboxylic acid aryl ester, or for aryloxyalkyl; and at least one of the substituents $R_1$ and $R_4$ represents aryloxy, aralkoxy, carboxylic acid aralkyl ester, carboxylic acid aryl ester or aryloxyalkyl;

$R_2$ stands for hydrogen, lower alkyl, cycloalkyl, aralkyl or aryl;

$R_3$ stands for hydrogen or for lower alkyl which may close a 5- or 6-membered ring in a position adjacent to the aryl ring B; the heterocyclic 5- or 6-membered ring thus formed may be alkyl-substituted or fused with a further carbocyclic ring;

$R_5$ stands for lower alkyl, aralkyl or cycloalkyl;

$R_6$ stands for lower alkyl, aralkyl or cycloalkyl;

$a$ stands for the numbers 0, 1, 2 or 3;

$b$ stands for the numbers 0, 1, 2 or 3;

$A^-$ stands for an anion; and in which the rings B and D may be fused with carbocyclic rings, and the aromatic carbocyclic rings of the dyestuff may contain further non-ionic substituents, are prepared by condensing amines of the Formula XIII

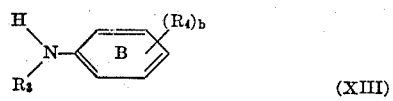

in which $b$, B, $R_3$ and $R_4$ have the same meaning as above, in known manner with aldehydes of the formula

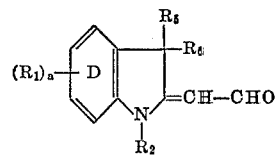

in which $a$, D, $R_1$, $R_2$, $R_5$ and $R_6$ have the same meaning as above, or with their functional derivatives.

The condensation can be carried out by stirring a solution or suspension of equimolar amounts of the Compounds XIII and XIV in an organic or inorganic acid, or in a mixture thereof with water, at 10–120° C., preferably at 20–60° C. Suitable acids are, for example, dilute aqueous mineral acids, such as sulphuric acid, phosphoric acid or hydrochloric acid. Lower fatty acids, such as formic acid, acetic acid, propionic acid, butyric acid, lactic acid and their mixtures with water are also suitable.

The condensation can also be carried out in a solvent, such as benzene, toluene, chlorobenzene, methanol and ethanol, in the presence of acidic condensation agents, such as phosphorus, oxychloride, phosphorus pentoxide, zinc chloride, aluminum chloride, tin chloride, sulphuric acid, phosphoric acid, polyphosphoric acid or hydrochloric acid, or in mixtures thereof.

The dyestuffs of the Formulae II to XII can be prepared in the same way.

Examples of amine components of the Formula XIII are:

4-aminodiphenyl ether,
4-amino-4'-methyl-diphenyl ether,
4-amino-4'-ethyl-diphenyl ether,
4-amino-4'-tert.-butyl-diphenyl ether,
4-amino-4'-cyclohexyl-diphenyl ether,
4-amino-2'-methyl-diphenyl ether,
4-amino-3'-methyl-diphenyl ether,
4-amino-4'-methoxy-diphenyl ether,
4-amino-3'-methoxy-diphenyl ether,
4-amino-4'-ethoxy-diphenyl ether,
4-amino-4'-acetylamino-diphenyl ether,
4-amino-4'-hydroxydiphenyl ether,
4-amino-4'-nitrodiphenyl ether,
4-amino-4'-chlorodiphenyl ether,
4-amino-2'-chlorodiphenyl ether,
4-amino-3'-chlorodiphenyl ether,
4-amino-phenyl-α-naphthyl ether,
4-aminophenyl-β-naphthyl ether,
4-amino-2',3',5'-trimethyl-diphenyl ether,
4-4-aminophenyl-benzyl ether,
3-aminophenyl-benzyl ether,
2-amino-phenyl-benzyl ether,
2-aminodiphenyl ether,
4-aminophenyl-p-methylbenzyl ether,
4-aminophenyl-p-chloro-benzyl ether,
4-aminophenyl-o-chlorobenzyl ether,
4-aminophenyl-m, p-dichlorobenzyl ether,
4-aminobenzyl-2',4',5'-trichlorobenzyl ether,
3-aminophenyl-p-methylbenzyl ether,
3-aminophenyl-p-chlorobenzyl ether,
3-aminophenyl-o-chlorobenzyl ether,
3-aminophenyl-m,p-dichlorobenzyl ether,
3-aminophenyl-2',4',5'-trichlorobenzyl ether,
2-aminophenyl-p-methylbenzyl ether,
2-aminophenyl-p-chlorobenzyl ether,
2-aminophenyl-m,p-dichlorobenzyl ether,
2-aminophenyl-2',4',5'-trichlorobenzyl ether,
4-amino-2-methyl-phenyl-benzyl ether
5-amino-2-methyl-phenyl-benzyl ether
2-amino-5-methyl-phenyl-benzyl ether
4-amino-2-methoxy-phenyl-benzyl ether
4-amino-3-methoxy-phenyl-benzyl ether 4-amino-3-methyl-phenyl-benzyl ether
4-amino-3-chloro-phenyl-benzyl ether
4-amino-2-chloro-phenyl-benzyl ether
4-amino-2-methyl-phenyl-p-methylbenzyl ether,
5-amino-2-methyl-phenyl-m,p-dichlorobenzyl ether,
2-amino-5-methyl-phenyl-p-chlorobenzyl ether,
4-amino-2-methoxy-phenyl-p-methylbenzyl ether, .
4-amino-3-methyl-phenyl-2′,4′,5′-trichlorobenzyl ether,
aniline, p-toluidine, m-toluidine, o-anisidine, m-anisidine, p-anisidine,
o-phenetidine, p-phenetidine, 4-dodecyloxy-aniline, 4-amino-acetanilide,
N-benzoyl-p-phenylene-diamine,
2,4-dimethoxy-aniline,
2,5-dimethoxy-aniline,
3,4-dimethoxy-aniline,
2-chloro-4-amino-anisole,
2,4,5-trimethyl-aniline,
2,3,5-trimethyl-aniline,
5-amino-2-acetylamino-anisole,
6-amino-3-methoxy-toluene,
3,4-dicyanoaniline,
p-sulphanilic acid amide,
4-aminobenzamide,
4-chloroaniline,
4-fluoroaniline,
1,2,3,4-tetrahydro-5-amino-naphthalene,
4-amino-2,5-diethoxy-benzoic acid anilide,
4-amino-2-methyl-5-methoxy-benzanilide,
4-cyclohexyl-aniline, 2,4-diethoxy-aniline,
2-aminonaphthalene,
2-methyl-2,3-dihydroindole,
hexahydrocarbazole,
1,2,3,4-tetrahydroquinoline,
1,2,3,4-tetrahydro-6-methoxyquinoline,
4-methylamino-phenylbenzyl ether,
4-ethylamino-phenylbenzyl ether.

Suitable aldehydes of the Formula XIV are, for example:

1,3,3-trimethyl-2-methylene-2,3-dihydroindole-ω-aldehyde
1,3,3,5-tetramethyl-2-methylene-2,3-dihydroindole-ω-aldehyde
1,3,3-trimethyl-5-chloro-2-methylene-2,3-dihydroindole-ω-aldehyde
1,3,3-trimethyl-5-methoxy-2-methylene-2,3-dihydroindole-ω-aldehyde
1,3,3-trimethyl-5-carbomethoxy-2-methylene-2,3-dihydroindole-ω-aldehyde
1,3,3-trimethyl-5-carbethoxy-2-methylene-2,3-dihydroindole-ω-aldehyde
1,3,3-trimethyl-5-cyclohexyl-2-methylene-2,3-dihydroindole-ω-aldehyde
1,3,3-trimethyl-5-benzyl-2-methylene-2,3-dihydroindole-ω-aldehyde
1,3,3-trimethyl-5-nitro-2-methylene-2,3-dihydroindole-ω-aldehyde
1,3,3-trimethyl-7-methyl-2-methylene-2,3-dihydroindole-ω-aldehyde
1,3,3-trimethyl-5-trifluoromethyl-2-methylene-2,3-dihydroindole-ω-aldehyde
1,3,3-trimethyl-7-methoxy-2-methylene-2,3-dihydroindole-ω-aldehyde
1-ethyl-3,3-dimethyl-2-methylene-2,3-dihydroindole-ω-aldehyde
1-ethyl-3,3,5-trimethyl-2-methylene-2,3-dihydroindole-ω-aldehyde
1-ethyl-3,3-dimethyl-5-chloro-2-methylene-2,3-dihydroindole-ω-aldehyde
1-ethyl-3,3-dimethyl-5-methoxy-2-methylene-2,3-dihydroindole-ω-aldehyde
1-ethyl-3,3-dimethyl-5-carbomethoxy-2-methylene-2,3-dihydroindole-ω-aldehyde
1-ethyl-3,3-dimethyl-5-carbethoxy-2-methylene-2,3-dihydroindole-ω-aldehyde
1-ethyl-3,3,7-trimethyl-5-cyclohexyl-2-methylene-2,3-dihydroindole-ω-aldehyde
1-ethyl-3,3-dimethyl-5-benzyl-2-methylene-2,3-dihydroindole-ω-aldehyde
1-ethyl-3,3-dimethyl-5-nitro-2-methylene-2,3-dihydroindole-ω-aldehyde
1-benzyl-3,3-dimethyl-2-methylene-2,3-dihydroindole-ω-aldehyde
1-phenyl-3,3-dimethyl-2-methylene-2,3-dihydroindole-ω-aldehyde
1,3,3-trimethyl-5-benzyloxy-2-methylene-2,3-dihydroindole-ω-aldehyde
1-ethyl-3,3-dimethyl-5-benzyloxy-2-methylene-2,3-dihydroindole-ω-aldehyde
1,3,3-trimethyl-7-benzyl-2-methylene-2,3-dihydroindole-ω-aldehyde
1,3,3-trimethyl-4-benzyloxy-2-methylene-2,3-dihydroindole-ω-aldehyde
1,3,3-trimethyl-6-benzyloxy-2-methylene-2,3-dihydroindole-ω-aldehyde
1,3,3-trimethyl-7-benzyloxy-2-methylene-2,3-dihydroindole-ω-aldehyde
1,3,3-trimethyl-7-chloro-2-methylene-2,3-dihydroindole-ω-aldehyde
1,3,3-trimethyl-5-(4′-methylbenzyloxy)-2-methylene-2,3-dihydroindole-ω-aldehyde
1,3,3-trimethyl-5-(2′-chlorobenzyloxy)-2-methylene-2,3-dihydroindole-ω-aldehyde
1,3,3-trimethyl-7-(4′-chlorobenzyloxy)-2-methylene-2,3-dihydroindole-ω-aldehyde
1,3,3-trimethyl-5-methyl-7-benzyloxy-2-methylene-2,3-dihydroindole-ω-aldehyde
1,3,3-trimethyl-4-methoxy-5-benzyloxy-2-methylene-2,3-dihydroindole-ω-aldehyde
1,3,3-trimethyl-6-methoxy-5-benzyloxy-2-methylene-2,3-dihydroindole-ω-aldehyde
1,3,3-trimethyl-5-methyl-4-benzyloxy-2-methylene-2,3-dihydroindole-ω-aldehyde
1,3,3-trimethyl-5-methyl-6-benzyloxy-2-methylene-2,3-dihydroindole-ω-aldehyde
1,3,3-trimethyl-7-(4′-methylbenzyloxy)-2-methylene-2,3-dihydroindole-ω-aldehyde
1,3,3-trimethyl-7-(2′-chlorobenzyloxy)-2-methylene-2,3-dihydroindole-ω-aldehyde
1,3,3-trimethyl-5-benzyloxy-7-methyl-2-methylene-2,3-dihydroindole-ω-aldehyde
1,3,3-trimethyl-5-methyl-7-(4′-methylbenzyloxy)-2-methylene-2,3-dihydroindole-ω-aldehyde
1,3,3-trimethyl-5-phenoxy-2-methylene-2,3-dihydroindole-ω-aldehyde
1,3,3-trimethyl-7-phenoxy-2-methylene-2,3-dihydroindole-ω-aldehyde
1,3,3-trimethyl-5-(4′-methylphenoxy)-2-methylene-2,3-dihydroindole-ω-aldehyde
1,3,3-trimethyl-5-(4′-methoxyphenoxy)-2-methylene-2,3-dihydroindole-ω-aldehyde
1,3,3-trimethyl-7-(4′-methoxyphenoxy)-2-methylene-2,3-dihydroindole-ω-aldehyde
1,3,3-trimethyl-5-(4′-chlorophenoxy)-2-methylene-2,3-dihydroindole-ω-aldehyde
1,3,3-trimethyl-7-(3′-methylphenoxy)-2-methylene-2,3-dihydroindole-ω-aldehyde
1,3,3-trimethyl-5-(3′-methoxyphenoxy)-2-methylene-2,3-dihydroindole-ω-aldehyde
1,3,3-trimethyl-5-α-naphthyloxy-2-methylene-2,3-dihydroindole-ω-aldehyde
1,3,3-trimethyl-5-(4′-ethylphenoxy)-2-methylene-2,3-dihydroindole-ω-aldehyde
1,3,3-trimethyl-5-carbobenzoxy-2-methylene-2,3-dihydroindole-ω-aldehyde
1,3,3-trimethyl-5-carbo-β-phenylethoxy-2-methylene-2,3-dihydroindole-ω-aldehyde
1,3,3-trimethyl-5-carbo-α-phenyl-ethoxy-2-methylene-2,3-dihydroindole-ω-aldehyde
1,3,3-trimethyl-5-carbo-γ-phenylpropoxy-2-methylene-2,3-dihydroindole-ω-aldehyde 1,3,3-trimethyl-6,7-benzo-2-methylene-2,3-dihydroindole-
ω-aldehyde
1,3,3-trimethyl-6,7-benzo-2-methylene-2,3,3',4',5',6'-
hexahydroindole-ω-aldehyde
1,3,3-trimethyl-5-fluoro-2-methylene-2,3-dihydroindole-
ω-aldehyde
1,3,3-trimethyl-5-ethoxy-2-methylene-2,3-dihydroindole-
ω-aldehyde
1,3,3-trimethyl-7-ethoxy-2-methylene-2,3-dihydroindole-
ω-aldehyde
1,3,3-trimethyl-5-cyano-2-methylene-2,3-dihydroindole-
ω-aldehyde
1,3,3-trimethyl-5-acetylamino-2-methylene-2,3-dihydro-
indole-ω-aldehyde
1,3,3-trimethyl-5-methylsulphonyl-2-methylene-2,3-
dihydroindole-ω-aldehyde
1,3,3-trimethyl-5-phenylsulphonyl-2-methylene-2,3-
dihydroindole-ω-aldehyde
1,3-dimethyl-3-ethyl-2-methylene-2,3-dihydroindole-ω-
aldehyde
1,3,3-trimethyl-5-sulphonamido-2-methylene-2,3-dihydro-
indole-ω-aldehyde
1,3,3-trimethyl-5-carboxamido-2-methylene-2,3-dihydro-
indole-ω-aldehyde
1,3,3-trimethyl-5-carboxylic acid-N-ethylanilide-2-methyl-
ene-2,3-dihydroindole-ω-aldehyde
1,3,3-trimethyl-7-ethyl-2-methylene-2,3-dihydroindole-ω-
aldehyde
1,3,3-trimethyl-5-chloro-7-methoxy-2-methylene-2,3-
dihydroindole-ω-aldehyde
1,3,3-trimethyl-4-chloro-7-methoxy-2-methylene-2,3-
dihydroindole-ω-aldehyde
1,3,3-trimethyl-4,6-dicarbomethoxy-2-methylene-2,3-
dihydroindole-ω-aldehyde
1,3,3-trimethyl-4,5-dichloro-7-methoxy-2-methylene-2,3-
dihydroindole-ω-aldehyde
1,3,3-trimethyl-5-chloro-4,7-dimethoxy-2-methylene-2,3-
dihydroindole-ω-aldehyde
1,3,3,4,5,7-hexamethyl-2-methylene-2,3-dihydroindole-ω-
aldehyde
1,3,3,4,6,7-hexamethyl-2-methylene-2,3-dihydroindole-ω-
aldehyde.

Another method of preparing the methine dyestuffs of the Formulae I, II, III, IV, V, VI, VII, VIII, IX, X, XI and XII is based on the condensation of N-formyl compounds of the formula

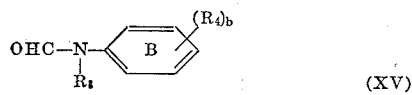

in which b, B, R₃ and R₄ have the same meaning as above,
with dihydroindoles of the formula

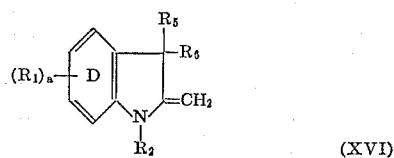

in which a, D, R₁, R₂, R₅ and R₆ have the same meaning as above.

The process is carried out, for example, by heating an amine of the above Formula XIII and formic acid in an inert solvent, for example, chlorobenzene, until the water formed has been azeotropically distilled off. The operation is then continued at the distillation temperature of the inert solvent, for example, at 100–140° C.

The resultant solution of the compound of the Formula XV is then mixed with the equivalent amount of the methylene base (XVI). An acidic condensation agent is then added at room temperature, and the condensation is carried out at temperatures of 20–70° C. Suitable condensation agents, are, for example, phosphorus oxychloride, phosphorus pentoxide, polyphosphoric acid, sulphuric acid. Amines suitable for this reaction are e.g. the examples mentioned above for Formula VIII. Suitable 2,3-dihydro-2-methylene-indoles of the Formula XVI have already been mentioned above in the form of their ω-aldehydes of the Formula XIV. The dyestuffs of the Formulae II–XII can be prepared in the same way.

The new products are valuable dyestuffs which can be used for the dyeing and printing of materials of leather, tanned cotton, cellulose, synthetic superpolyamides and superpolyurethanes, as well as for the dyeing of lignin-containing fibres such as coconut, jute and sisal. They are further suitable for the production of writing liquids, stamping inks, pastes for ball point pens, and can also be used in offset printing.

Suitable for dyeing with the basic dyestuffs of the above general formula are primarily loose material, fibres, threads, ribbons, fabrics or knitted fabrics of polyacrylonitrile or of copolymers of acrylonitrile with other vinyl compounds, such as vinyl chloride, vinylidene chloride, vinyl fluoride, vinyl acetate, vinyl-pyridine, vinyl-imidazole, vinyl alcohol, acrylic and methacrylic acid esters and amides, as. dicyano-ethylene; or loose material, fibres, filaments, ribbons, fabrics or knitted fabrics of acid-modified aromatic polyesters and acid-modified polyamide fibres. Acid-modified aromatic polyesters are, for example, polycondensation products of sulphoterephthalic acid and ethylene glycol, i.e. polyethylene glycol terephthalates containing sulphonic acid (type Dacron 64 of E. I. du Pont de Nemours and Company), such as are described in Belgian patent specification No. 549,179 and U.S. patent specification No. 2,893,816.

The dyeing can be carried out from a weakly acidic bath; the material is expediently introduced into the dyebath at 40–60° C. and dyeing is then performed at boiling temperature. It is also possible to dye under pressure at temperatures above 100° C. Furthermore, the dyestuffs can also be added to spinning solutions for the preparation of fibres containing polyacrylonitrile or they can be added to the unstretched fibre. Dyeings on polyacrylonitrile, acid-modified polyesters and acid-modified polyamide are characterized by their very good fastness to light, wet processing, rubbing and sublimation and by their high affinity to the fibre. With anionic precipitation agents, such as alumina, tannin, phosphotungstic-(molybdic) acids, the dyestuff form pigments which are fast to light and can be used with advantage in paper printing.

The dyestuffs can be used individually or as mixtures.

The dyestuffs according to the invention are well suited for the dyeing of moulded articles consisting of polymers or copolymers of acrylonitrile, as. dicyanoethylene, acid-modified aromatic polyesters or acid-modified synthetic superpolyamides, with the use of chlorinated hydrocarbons as dyebath, if they carry substituents furthering the solubility in chlorinated hydrocarbons, such as e.g. the tert.-butyl group or long-chain alkoxy groups such as the dodecyl group, or if the anion A⁻ in the Formulae I to XII is the anion of a monobasic organic acid with 4–30 carbon atoms. Organic acids of this type are, for example: 2-ethyl-caproic acid, lauric acid, oleic acid, linoleic acid; a mixture of an aliphatic carboxylic acid with 15–19 carbon atoms (Versatic acid 1519 of the firm Shell), a mixture of aliphatic carboxylic acids with 9–11 carbon atoms (Versatic acids 911 of the firm Shell); coconut fatty acid first runnings; tetradecanic acid, undecylenic acid, dimethylpropanic acid, dimethyl-acetic acid; carboxylic acids the carbon chain of which is interrupted by hetero atoms, such as nonylphenol tetraethylene glycol ether-propionic acid, nonylphenol diethylene glycol ether-propionic acid, dodecyl tetraethylene glycol ether-propionic acid, 3-(nonyloxy)-propionic acid, 3-(isotridecyloxy)-propionic acid, 3-(isotridecyloxy)-diethylene glycol ether-propionic acid; ether-propionic acid of the alcohol mixture with 6-10 carbon atoms; nonyl-phenoxy-acetic acid; aromatic carboxylic acids, such as tert.-butyl-benzoic acid; cycloaliphatic carboxylic acids such as hexahydrobenzoic acid, cyclohexenecarboxylic acid, abietic acid; and sulphonic acids such as tetrapropylene-benzene-sulphonic acid.

Stable concentrated solutions of these dyestuffs in chlorinated hydrocarbons can be prepared, possibly with the addition of polar organic solvents which are completely miscible with the chlorinated hydrocarbons, such as butyrolactone, dimethyl formamide, methanol, dioxan, acetonitrile, methyl ethyl ketone, nitrobenzene, dimethyl sulphoxide, benzonitrile and 2-nitrochlorobenzene, particularly if the dyestuffs according to the invention are present in the form of the salts of the aforesaid monobasic organic acids with 4-30 carbon atoms.

In order to prepare such solutions, the methine dyestuffs according to the invention (in the form of the free bases or as salts of organic acids with 4-30 carbon atoms) are stirred with chlorinated hydrocarbons and monobasic organic acids with 4-30 carbon atoms, possibly with the addition of polar organic solvents which are completely miscible with chlorinated hydrocarbons and possibly at an elevated temperature.

The parts by weight and parts by volume in the example are in the ratio of grams to millilitres.

EXAMPLE 1

29.3 parts by weight 1,3,3-trimethyl-7-phenoxy-2-methylene-2,3-dihydroindole-ω-aldehyde and 13.3 parts by weight 2-methyl-2,3-dihydroindole are stirred with 60 parts by volume glacial acetic acid and 15 parts by volume of water at room temperature for 4 hours, and the mixture is then diluted with 1000 parts by volume of water. The resultant dyestuff is salted out with 50 parts by weight of common salt, separated from the solution, reprecipitated from 1500 parts by volume of water, again salted out with common salt, separated and dried.

It has the formula

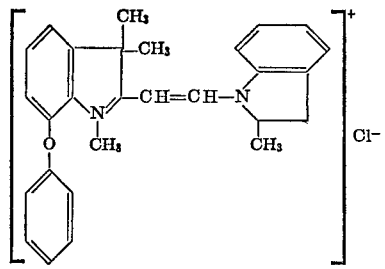

and dyes materials of polyacrylonitrile, acid-modified polyesters and acid-modified polyamide in greenish yellow shades of very good fastness to light and wet processing.

When the following aldehydes and amines are used in an analogous way, similar valuable dyestuffs are obtained which dye materials of polyacrylonitrile in the specified shades.

| Aldehyde | Amine | Shade |
|---|---|---|
| 1,3,3-trimethyl-2-methylene-2,3-dihydroindole-ω-aldehyde. | 4-amino-phenyl-benzyl ether. | Greenish yellow. |
| 1,3,3-trimethyl-5-methyl-2-methylene-2,3-dihydroindole-ω-aldehyde. | ___do___ | Do. |
| 1,3,3-trimethyl-5-methoxy-2-methylene-2,3-dihydroindole-ω-aldehyde. | ___do___ | Yellow. |
| 1,3,3-trimethyl-5-carbomethoxy-2-methylene-2,3-dihydroindole-ω-aldehyde. | ___do___ | Greenish yellow. |
| 1,3,3-trimethyl-5-carbethoxy-2-methylene-2,3-dihydroindole-ω-aldehyde. | ___do___ | Do. |
| 1,3,3-trimethyl-5-cyclohexyl-2-methylene-2,3-dihydroindole-ω-aldehyde. | ___do___ | Do. |
| 1,3,3-trimethyl-5-benzyl-2-methylene-2,3-dihydroindole-ω-aldehyde. | ___do___ | Do. |
| 1,3,3-trimethyl-5-nitro-2-methylene-2,3-dihydroindole-ω-aldehyde. | 4-amino-phenyl-benzyl ether. | Reddish yellow. |
| 1,3,3-trimethyl-7-methyl-2-methylene-2,3-dihydroindole-ω-aldehyde. | ___do___ | Greenish yellow. |
| 1,3,3-trimethyl-5-trifluoromethyl-2-methylene-2,3-dihydroindole-ω-aldehyde. | ___do___ | Do. |
| 1,3,3-trimethyl-7-methoxy-2-methylene-2,3-dihydroindole-ω-aldehyde. | ___do___ | Do. |
| 1,3,3-trimethyl-7-chloro-2-methylene-2,3-dihydroindole-ω-aldehyde. | ___do___ | Do. |
| 1,3,3-trimethyl-5-chloro-2-methylene-2,3-dihydroindole-ω-aldehyde. | ___do___ | Do. |
| 1-ethyl-3,3-dimethyl-2-methylene-2,3-dihydroindole-ω-aldehyde. | ___do___ | Do. |
| 1-ethyl-3,3-dimethyl-5-methyl-2-methylene-2,3-dihydroindole-ω-aldehyde. | ___do___ | Do. |
| 1-ethyl-3,3-dimethyl-5-chloro-2-methylene-2,3-dihydroindole-ω-aldehyde. | ___do___ | Do. |
| 1-ethyl-3,3-dimethyl-5-methoxy-2-methylene-2,3-dihydroindole-ω-aldehyde. | ___do___ | Yellow. |
| 1-ethyl-3,3-dimethyl-5-carbethoxy-2-methylene-2,3-dihydroindole-ω-aldehyde. | ___do___ | Greenish yellow. |
| 1-ethyl-3,3-dimethyl-5-cyclohexyl-2-methylene-2,3-dihydroindole-ω-aldehyde. | ___do___ | Do. |
| 1-ethyl-3,3-dimethyl-5-benzyl-2-methylene-2,3-dihydroindole-ω-aldehyde. | ___do___ | Do. |
| 1-ethyl-3,3-dimethyl-5-nitro-2-methylene-2,3-dihydroindole-ω-aldehyde. | ___do___ | Reddish yellow. |
| 1,3,3-trimethyl-7-benzyl-2-methylene-2,3-dihydroindole-ω-aldehyde. | ___do___ | Greenish yellow. |
| Mixture of 1,3,3-trimethyl-4-methyl-2-methylene-2,3-dihydroindole-ω-aldehyde and 1,3,3-trimethyl-6-methyl-2-methylene-2,3-dihydroindole-ω-aldehyde. | ___do___ | Do. |
| 1,3,3-trimethyl-6,7-benzo-2-methylene-2,3,3',4',5',6'-hexahydroindole-ω-aldehyde. | ___do___ | Reddish yellow. |
| 1,3,3-trimethyl-5-fluoro-2-methylene-2,3-dihydroindole-ω-aldehyde. | ___do___ | Greenish yellow. |
| 1,3,3-trimethyl-5-ethoxy-2-methylene-2,3-dihydroindole-ω-aldehyde. | ___do___ | Yellow. |
| 1,3,3-trimethyl-7-ethoxy-2-methylene-2,3-dihydroindole-ω-aldehyde. | ___do___ | Greenish yellow. |
| 1,3,3-trimethyl-5-cyano-2-methylene-2,3-dihydroindole-ω-aldehyde. | ___do___ | Do. |
| 1,3,3-trimethyl-5-acetylamino-2-methylene-2,3-dihydroindole-ω-aldehyde. | ___do___ | Yellow. |
| 1,3,3-trimethyl-5-methylsulphonyl-2-methylene-2,3-dihydroindole-ω-aldehyde. | ___do___ | Greenish yellow. |
| 1,3,3-trimethyl-5-phenylsulphonyl-2-methylene-2,3-dihydroindole-ω-aldehyde. | ___do___ | Yellow. |
| 1,3-dimethyl-3-ethyl-2-methylene-2,3-dihydroindole-ω-aldehyde. | ___do___ | Greenish yellow. |
| 1,3,3-trimethyl-6,7-benzo-2-methylene-2,3-dihydroindole-ω-aldehyde. | ___do___ | Yellow. |
| 1,3,3-trimethyl-5-sulphonamido-2-methylene-2,3-dihydroindole-ω-aldehyde. | ___do___ | Greenish yellow. |
| 1,3,3-trimethyl-5-carboxamido-2-methylene-2,3-dihydroindole-ω-aldehyde. | ___do___ | Do. |
| 1,3,3-trimethyl-5-carboxylic acid ethylanilide-2-methylene-2,3-dihydroindole-ω-aldehyde. | ___do___ | Do. |
| 1,3,3-trimethyl-7-ethyl-2-methylene-2,3-dihydroindole-ω-aldehyde. | ___do___ | Do. |
| 1,3,3-trimethyl-5-chloro-7-methoxy-2-methylene-2,3-dihydroindole-ω-aldehyde. | ___do___ | Do. |
| 1,3,3-trimethyl-4-chloro-7-methoxy-2-methylene-2,3-dihydroindole-ω-aldehyde. | ___do___ | Do. |
| 1,3,3-trimethyl-4,5-dichloro-7-methoxy-2-methylene-2,3-dihydroindole-ω-aldehyde. | ___do___ | Do. |
| 1,3,3-trimethyl-5-chloro-4,7-dimethoxy-2-methylene-2,3-dihydroindole-ω-aldehyde. | ___do___ | Do. |
| 1,3,3-trimethyl-4,6-dicarbomethoxy-2-methylene-2,3-dihydroindole-ω-aldehyde. | ___do___ | Do. |
| 1,3,3,4,5,7-hexamethyl-2-methylene-2,3-dihydroindole-ω-aldehyde. | ___do___ | Do. |
| 1,3,3,4,6,7-hexamethyl-2-methylene-2,3-dihydroindole-ω-aldehyde. | ___do___ | Do. |
| 1,3,3-trimethyl-2-methylene-2,3-dihydroindole-ω-aldehyde. | 3-amino-phenyl-benzyl ether. | Do. |
| Do | 2-amino-phenyl-benzyl ether. | Yellow. |

TABLE—Continued

| Aldehyde | Amine | Shade |
|---|---|---|
| 1,3,3-trimethyl-2-methylene-2,3-dihydroindole-ω-aldehyde. | 4-aminophenyl-p-methylbenzyl ether. | Greenish yellow. |
| Do | 4-aminophenyl-p-chlorobenzyl ether. | Do. |
| Do | 4-aminophenyl-o-chloro-benzyl ether. | Do. |
| Do | 4-aminophenyl-m,p-dichloro-benzyl ether. | Do. |
| Do | 3-aminophenyl-p-methyl-benzyl ether. | Do. |
| Do | 3-aminophenyl-p-chloro-benzyl ether. | Do. |
| Do | 3-aminophenyl-p-chloro-benzyl ether. | Do. |
| Do | 3-aminophenyl-m,o-dichloro-benzyl ether. | Do. |
| Do | 2-aminophenyl-p-methyl-benzyl ether. | Yellow. |
| Do | 2-aminophenyl-p-chloro-benzyl ether. | Do. |
| Do | 2-aminophenyl-m,p-dichloro-benzyl ether. | Do. |
| Do | 4-amino-2-methyl-phenyl-benzyl ether. | Do. |
| Do | 5-amino-2-methyl-phenyl-benzyl ether. | Do. |
| Do | 2-amino-5-methyl-phenyl-benzyl ether. | Do. |
| Do | 4-amino-2-methoxy-phenyl-benzyl ether. | Reddish yellow. |
| Do | 4-amino-3-methoxy-phenyl-benzyl ether. | Yellow. |
| Do | 4-amino-3-methyl-phenyl-benzyl ether. | Do. |
| Do | 4-amino-3-chloro-phenyl-benzyl ether. | Do. |
| Do | 4-amino-2-chloro-phenyl-benzyl ether. | Do. |
| Do | 4-amino-2-methyl-phenyl-p-methyl-benzyl ether. | Do. |
| Do | 5-amino-2-methyl-phenyl-m,p-dichlorobenzyl ether. | Do. |
| Do | 4-amino-2-methoxy-phenyl-p-methyl-benzyl ether. | Reddish yellow. |
| Do | 2-amino-5-methyl-phenyl-p-chloro-benzyl ether. | Yellow. |
| Do | 4-methylamino-phenylbenzyl ether. | Do. |
| Do | 4-ethylamino-phenylbenzyl ether. | Do. |
| 1,3,3-trimethyl-5-carbomethoxy-2-methylene-2,3-dihydroindole-ω-aldehyde. | 3-aminophenyl-benzyl ether. | Greenish yellow. |
| Do | 2-aminophenyl-benzyl ether. | Yellow. |
| 1,3,3-trimethyl-5-chloro-2-methylene-2,3-dihydroindole-ω-aldehyde. | 2-aminophenyl-benzyl ether. | Do. |
| Do | 3-aminophenyl-benzyl ether. | Greenish yellow. |
| 1,3,3-trimethyl-2-methylene-2,3-dihydroindole-ω-aldehyde. | 4-aminodiphenyl ether. | Do. |
| 1,3,3-trimethyl-5-methyl-2-methylene-2,3-dihydroindole-ω-aldehyde. | do | Do. |
| 1,3,3-trimethyl-5-methoxy-2-methylene-2,3-dihydroindole-ω-aldehyde. | do | Yellow. |
| 1,3,3-trimethyl-5-carbomethoxy-2-methylene-2,3-dihydroindole-ω-aldehyde. | do | Greenish yellow. |
| 1,3,3-trimethyl-7-methyl-2-methylene-2,3-dihydroindole-ω-aldehyde. | do | Do. |
| 1,3,3-trimethyl-5-chloro-2-methylene-2,3-dihydroindole-ω-aldehyde. | do | Do. |
| 1,3,3-trimethyl-5-flouro-2-methylene-2,3-dihydroindole-ω-aldehyde. | do | Do. |
| 1,3,3-trimethyl-7-ethoxy-2-methylene-2,3-dihydroindole-ω-aldehyde. | do | Do. |
| 1,3,3-trimethyl-5-benzyl-2-methylene-2,3-dihydroindole-ω-aldehyde. | do | Do. |
| 1-ethyl-3,3-dimethyl-2-methylene-2,3-dihydroindole-ω-aldehyde. | do | Do. |
| 1,3,3,4,6,7-hexamethyl-2-methylene-2,3-dihydroindole-ω-aldehyde. | do | Do. |
| 1,3,3-trimethyl-2-methylene-2,3-dihydroindole-ω-aldehyde. | 2-aminodiphenyl ether. | Yellow. |
| 1,3,3-trimethyl-5-chloro-2-methylene-2,3-dihydroindole-ω-aldehyde. | do | Do. |
| 1,3,3-trimethyl-5-carbomethoxy-2-methylene-2,3-dihydroindole-ω-aldehyde. | do | Do. |
| 1,3,3-trimethyl-2-methylene-2,3-dihydroindole-ω-aldehyde. | 4-amino-4'-methyl-diphenyl ether. | Greenish yellow. |
| Do | 4-amino-4'-ethyl-diphenyl ether. | Do. |
| Do | 4-amino-4'-tert.-butyl-diphenyl ether. | Do. |
| 1,3,3-trimethyl-2-methylene-2,3-dihydroindole-ω-aldehyde. | 4-amino-4'-cyclohexyl-diphenyl ether. | Yellow. |
| Do | 4-amino-2'-methyl-diphenyl ether. | Do. |
| Do | 4-amino-3'-methyl-diphenyl ether. | Do. |
| Do | 4-amino-4'-methoxy-diphenyl ether. | Greenish yellow. |
| Do | 4-amino-3'-methoxy-diphenyl ether. | Yellow. |
| Do | 4-amino-4'-ethoxy-diphenyl ether. | Do. |
| Do | 4-amino-4'-acetyl-amino-diphenyl ether. | Do. |
| Do | 4-amino-4'-hydroxy-diphenyl ether. | Do. |
| Do | 4-amino-4'-nitro-diphenyl ether. | Reddish yellow. |
| Do | 4-amino-4'-chloro-diphenyl ether. | Greenish yellow. |
| Do | 4-amino-2'-chloro-diphenyl ether. | Yellow. |
| Do | 4-amino-3'-chloro-diphenyl ether. | Do. |
| Do | 4-aminophenyl-α-naphthyl ether. | Greenish yellow. |
| Do | 4-aminophenyl-β-naphthyl ether. | Do. |
| Do | 4-amino-2',3',5'-tri-methyl-diphenyl ether. | Yellow. |
| 1,3,3-trimethyl-5-chloro-2-methylene-2,3-dihydroindole-ω-aldehyde. | 4-amino-4'-ethyl-diphenyl ether. | Greenish yellow. |
| Do | 4-amino-4'-tert.-butyl-diphenyl ether. | Do. |
| Do | 4-amino-4'-methoxy-diphenyl ether. | Do. |
| Do | 4-aminophenyl-α-naphthyl ether. | Do. |
| 1,3,3-trimethyl-5-carbomethoxy-2-methylene-2,3-dihydroindole-ω-aldehyde. | 4-amino-phenyl-4'-methyl-diphenyl ether. | Do. |
| Do | 4-amino-phenyl-4'-methoxy-diphenyl ether. | Do. |
| Do | 4-amino-phenyl-α-naphthyl ether. | Do. |
| 1,3,3-trimethyl-7-phenoxy-2-methylene-2,3-dihydroindole-ω-aldehyde. | 4-aminodiphenyl-methane. | Yellow. |
| Do | 4-amino-diphenyl ether. | Do. |
| Do | 4-aminophenyl-benzyl ether. | Do. |
| Do | 3-aminophenyl-benzyl ether. | Greenish yellow. |
| Do | Aniline | Do. |
| Do | p-Toluidine | Do. |
| Do | m-Toluidine | Do. |
| Do | o-Anisidine | Yellow. |
| Do | m-Anisidine | Greenish yellow. |
| Do | p-Anisidine | Do. |
| Do | o-Phenetidine | Yellow. |
| Do | p-Phenetidine | Greenish yellow. |
| Do | 4-Dodecyloxy-aniline. | Yellow. |
| Do | 4-Aminoacetanilide | Greenish yellow. |
| Do | N-benzoyl-p-phenylene-diamine. | Do. |
| Do | 2,4-dimethoxy-aniline. | Reddish yellow. |
| Do | 2,5-dimethoxy-aniline. | Do. |
| Do | 3,4-dimethoxy-aniline. | Golden yellow. |
| Do | 3,4-diisopropoxy-aniline. | Do. |
| Do | 2-chloro-4-amino-anisole. | Reddish yellow. |
| Do | 2,4,5-trimethyl-aniline. | Greenish yellow. |
| Do | 2,3,5-trimethyl-aniline. | Do. |
| Do | 5-amino-2-acetyla-mino-anisole. | Reddish yellow. |
| Do | 6-amino-3-methoxy-toluene. | Yellow. |
| Do | 3,4-dicyano-aniline | Do. |
| Do | p-sulphanilic acid amide. | Do. |
| Do | 4-chloroaniline | Do. |
| Do | 4-fluoroaniline | Greenish yellow. |
| Do | 1,2,3,4-tetrahydro-5-aminonaphthalene. | Yellow. |
| Do | 4-amino-2,5-diethoxy-benzoic acid anilide. | Yellowish orange. |
| Do | 4-amino-2-methyl-5-methoxy-benzanilide. | Reddish yellow. |
| Do | 4-aminobenzamide | Yellow. |
| Do | 4-cyclohexyl-aniline | Do. |
| Do | 2,4-diethoxy-aniline | Reddish yellow. |

TABLE—Continued

| Aldehyde | Amine | Shade |
|---|---|---|
| 1,3,3-trimethyl-7-phenoxy-2-methylene-2,3-dihydroindole-ω-aldehyde. | 2-aminonaphthalene. | Yellow. |
| Do. | Hexahydrocarbazole. | Do. |
| Do. | 1,2,3,4-tetrahydroquinoline. | Do. |
| Do. | 1,2,3,4-tetrahydro-6-methoxyquinoline. | Do. |
| 1,3,3,-trimethyl-5-phenoxy-2-methylene-2,3-dihydroindole-ω-aldehyde. | 4-amino-1,3-dimethoxybenzene. | Reddish yellow. |
| Do. | 4-amino-1,4-dimethoxybenzene. | Do. |
| Do. | 3,4-dimethoxyaniline. | Golden yellow. |
| Do. | 2-chloro-4-aminoanisole. | Yellow. |
| Do. | p-Chloroaniline. | Do. |
| Do. | Aniline. | Greenish yellow. |
| Do. | p-Fluoroaniline. | Do. |
| Do. | 2,4,5-trimethylaniline. | Yellow. |
| Do. | 6-amino-3-methoxytoluene. | Do. |
| Do. | 5-amino-2-acetylamino-anisole. | Reddish yellow. |
| Do. | o-Phenetidine. | Yellow. |
| Do. | 3,4-dicyano-aniline. | Reddish yellow. |
| Do. | Sulphanilic acid amide. | Yellow. |
| Do. | 4-aminobenzamide. | Do. |
| Do. | o-Anisidine. | Do. |
| Do. | p-Anisidine. | Greenish yellow. |
| Do. | 2-methyl-2,3-dihydroindole. | Do. |
| Do. | p-Phenedidine. | Yellow. |
| Do. | 4-aminophenyl-benzyl ether. | Do. |
| Do. | 4-dodecyloxy-aniline. | Do. |
| Do. | 4-aminoacetanilide. | Do. |
| Do. | p-Toluidine. | Greenish yellow. |
| 1,3,3,-trimethyl-7-benzyloxy-2-methylene-2,3-dihydroindole-ω-aldehyde. | 2-methyl-2,3-dihydroindole. | Do. |
| Do. | p-Anisidine. | Do. |
| Do. | 3,4-dimethoxyaniline | Reddish yellow. |
| Mixture of 1,3,3-trimethyl-4-benzyloxy-2-methylene-2,3-dihydroindole-ω-aldehyde and 1,3,3-trimethyl-6-benzyloxy-2-methylene-2,3-dihydroindole-ω-aldehyde. | 2-methyl-2,3-dihydroindole. | Greenish yellow. |
| Do. | p-Anisidine. | Do. |
| 1,3,3-trimethyl-5-benzyloxy-2-methylene-2,3-dihydroindole-ω-aldehyde. | 2-methyl-2,3-dihydroindole. | Do. |
| Do. | p-Anisidine. | Do. |
| 1,3,3-trimethyl-7-benzyl-2-methylene-2,3-dihydroindole-ω-aldehyde. | 4-aminophenyl-benzyl ether. | Do. |
| 1,3,3-trimethyl-5-(p-methylbenzyloxy)-2-methylene-2,3-dihydroindole-ω-aldehyde. | 2-methyl-2,3-dihydroindole. | Do. |
| 1,3,3-trimethyl-5-benzyloxy-2-methylene-2,3-dihydroindole-ω-aldehyde. | 4-amino-1,3-dimethoxybenzene. | Golden yellow. |
| Do. | 4-amino-1,4-dimethoxybenzene. | Do. |
| Do. | 3,4-dimethoxy-aniline. | Do. |
| Do. | p-Chloro-aniline. | Yellow. |
| Do. | p-Fluoro-aniline. | Greenish yellow. |
| Do. | 2,4,5-trimethylaniline. | Yellow. |
| Do. | 6-amino-3-methoxytoluene. | Do. |
| Do. | 5-amino-2-acetylaminoanisole. | Reddish yellow. |
| Do. | o-Phenetidine. | Yellow. |
| Do. | 3,4-dicyano-aniline. | Golden yellow. |
| Do. | Sulphanilic acid amide. | Yellow. |
| Do. | 4-aminobenzamide. | Do. |
| Do. | p-Phenetidine. | Do. |
| Do. | 4-aminoacetanilide. | Do. |
| Do. | p-Toluidine. | Greenish yellow. |
| Do. | N-methyl-p-anisidine. | Do. |
| 1,3,3-trimethyl-5-(o-chlorobenzyloxy)-2-methylene-2,3-dihydroindole-ω-aldehyde. | 2-methyl-2,3-dihydroindole. | Yellow. |
| 1,3,3-trimethyl-7-(p-chlorobenzyloxy)-2-methylene-2,3-dihydroindole-ω-aldehyde. | ....do.... | Greenish yellow. |
| 1,3,3-trimethyl-5-methyl-7-benzyloxy-2-methylene-2,3-dihydroindole-ω-aldehyde. | ....do.... | Yellow. |
| Mixture of 1,3,3-trimethyl-4-methoxy-5-benzyloxy-2-methylene-2,3-dihydroindole-ω-aldehyde and 1,3,3-trimethyl-6-methoxy-5-benzyloxy-2-methylene-2,3-dihydroindole-ω-aldehyde. | ....do.... | Do. |
| Mixture of 1,3,3-trimethyl-5-methyl-6-benzyloxy-2-methylene-2,3-dihydroindole-ω-aldehyde and 1,3,3-trimethyl-5-methyl-4-benzyloxy-2-methylene-2,3-dihydroindole-ω-aldehyde. | 2-methyl-2,3-dihydroindole. | Yellow. |
| 1,3,3-trimethyl-7-(p-methylbenzyloxy)-2-methylene-2,3-dihydroindole-ω-aldehyde. | ....do.... | Greenish yellow. |
| 1,3,3-trimethyl-7-(o-chlorobenzyloxy)-2-methylene-2,3-dihydroindole-ω-aldehyde. | ....do.... | Yellow. |
| 1,3,3-trimethyl-5-benzyloxy-7-methyl-2-methylene-2,3-dihydroindole-ω-aldehyde. | ....do.... | Greenish yellow |
| 1,3,3-trimethyl-5-methyl-7-(p-methylbenzyloxy)-2-methylene-2,3-dihydroindole-ω-aldehyde. | ....do.... | Do. |
| 1,3,3-trimethyl-5-(4'-methylphenoxy)-2-methylene-2,3-dihydroindole-ω-aldehyde. | ....do.... | Do. |
| 1,3,3-trimethyl-5-(4'-methoxyphenoxy)-2-methylene-2,3-dihydroindole-ω-aldehyde. | ....do.... | Do. |
| 1,3,3-trimethyl-7-(4'-methoxyphenoxy)-2-methylene-2,3-dihydroindole-ω-aldehyde. | ....do.... | Do. |
| 1,3,3-trimethyl-5-(4'-chlorophenoxy)-2-methylene-2,3-dihydroindole-ω-aldehyde. | ....do.... | Yellow. |
| 1,3,3-trimethyl-7-(3'-methylphenoxy)-2-methylene-2,3-dihydroindole-ω-aldehyde. | ....do.... | Do. |
| 1,3,3-trimethyl-5-(3'-methoxyphenoxy)-2-methylene-2,3-dihydroindole-ω-aldehyde. | ....do.... | Do. |
| 1,3,3-trimethyl-5-α-naphthyloxy-2-methylene-2,3-dihydroindole-ω-aldehyde. | ....do.... | Do. |
| 1,3,3-trimethyl-5-(4'-ethylphenoxy)-2-methylene-2,3-dihydroindole-ω-aldehyde. | ....do.... | Do. |
| 1,3,3-trimethyl-5-(p-methylbenzyloxy)-2-methylene-2,3-dihydroindole-ω-aldehyde. | p-Anisidine. | Do. |
| 1,3,3-trimethyl-5-(o-chlorobenzyloxy)-2-methylene-2,3-dihydroindole-ω-aldehyde. | ....do.... | Do. |
| 1,3,3-trimethyl-5-(p-chlorobenzyloxy)-2-methylene-2,3-dihydroindole-ω-aldehyde. | ....do.... | Do. |
| 1,3,3-trimethyl-5-methyl-7-benzyloxy-2-methylene-2,3-dihydroindole-ω-aldehyde. | ....do.... | Do. |
| Mixture of 1,3,3-trimethyl-4-methoxy-5-benzyloxy-2-methylene-2,3-dihydroindole-ω-aldehyde and 1,3,3-trimethyl-6-methoxy-5-benzyloxy-2-methylene-2,3-dihydroindole-ω-aldehyde. | ....do.... | Do. |
| Mixture of 1,3,3-trimethyl-5-methyl-6-benzyloxy-2-methylene-2,3-dihydroindole-ω-aldehyde and 1,3,3-trimethyl-5-methyl-4-benzyloxy-2-methylene-2,3-dihydroindole-ω-aldehyde. | ....do.... | Do. |
| 1,3,3-trimethyl-7-(p-methylbenzyloxy)-2-methylene-2,3-dihydroindole-ω-aldehyde. | ....do.... | Do. |
| 1,3,3-trimethyl-7-(o-chlorobenzyloxy)-2-methylene-2,3-dihydroindole-ω-aldehyde. | ....do.... | Do. |
| 1,3,3-trimethyl-5-benzyloxy-7-methyl-2-methylene-2,3-dihydroindole-ω-aldehyde. | ....do.... | Do. |
| 1,3,3-trimethyl-5-methyl-7-(p-methylbenzyloxy)-2-methylene-2,3-dihydroindole-ω-aldehyde. | ....do.... | Do. |
| 1,3,3-trimethyl-5-(4'-methylphenoxy)-2-methylene-2,3-dihydroindole-ω-aldehyde. | ....do.... | Do. |
| 1,3,3-trimethyl-5-(4'-methoxyphenoxy)-2-methylene-2,3-dihydroindole-ω-aldehyde. | ....do.... | Do. |
| 1,3,3-trimethyl-7-(4'-methoxyphenoxy)-2-methylene-2,3-dihydroindole-ω-aldehyde. | ....do.... | Do. |
| 1,3,3-trimethyl-5-(4'-chlorophenoxy)-2-methylene-2,3-dihydroindole-ω-aldehyde. | ....do.... | Do. |
| 1,3,3-trimethyl-7-(3'-methylphenoxy)-2-methylene-2,3-dihydroindole-ω-aldehyde. | ....do.... | Do. |
| 1,3,3-trimethyl-5-(3'-methoxyphenoxy)-2-methylene-2,3-dihydroindole-ω-aldehyde. | ....do.... | Do. |
| 1,3,3-trimethyl-5-α-naphthyloxy-2-methylene-2,3-dihydroindole-ω-aldehyde. | ....do.... | Do. |
| 1,3,3-trimethyl-5-(4'-ethylphenoxy)-2-methylene-2,3-dihydroindole-ω-aldehyde. | ....do.... | Do. |
| 1,3,3-trimethyl-5-carbobenzoxy-2-methylene-2,3-dihydroindole-ω-aldehyde. | 2-methyl-2,3-dihydroindole. | Do. |
| Do. | p-Anisidine. | Do. |
| Do. | p-Phenetidine. | Do. |
| Do. | Hexahydrocarbazole. | Do. |
| Do. | p-Toluidine. | Do. |

TABLE—Continued

| Aldehyde | Amine | Shade |
|---|---|---|
| 1,3,3-trimethyl-5-benzyloxy-2-methylene-2,3-dihydroindole-ω-aldehyde. | 1,2,3,4-tetrahydro-quinoxaline. | Golden yellow. |
| 1,3,3-trimethyl-5-carbo-β-phenyl-ethyloxy-2-methylene-2,3-dihydroindole-ω-aldehyde. | 2-methyl-2,3-dihydroindole. | Yellow. |
| 1,3,3-trimethyl-5-carbo-α-phenyl-ethyloxy-2-methylene-2,3-dihydroindole-ω-aldehyde. | ......do............... | Do. |
| 1,3,3-trimethyl-5-carbo-γ-phenyl-propoxy-2-methylene-2,3-dihydroindole-ω-aldehyde. | ......do............... | Do. |
| 1-benzyl-3,3-dimethyl-2-methylene-2,3-dihydroindole-ω-aldehyde. | 4-aminophenyl-benzyl ether. | Do. |

EXAMPLE 2

A mixture of 13.3 parts by weight 2-methyl-2,3-dihydroindole, 10 parts by volume formic acid and 120 parts by volume chlorobenzene is slowly heated, with stirring, to a final temperature of 140° C. while about 65 parts by volume of liquid are distilled off, and the residue after distillation is then cooled to 30° C.

16 parts by weight phosphorus oxychloride are then added with stirring, and 27.9 parts by weight 1,3,3-trimethyl-5-benzyloxy-2-methylene - 2,3 - dihydroindole are subsequently added dropwise with stirring. The mixture is stirred without heating for 15 minutes, then at 60° C. for 3 hours. The dyestuff is separated from the solvent, redissolved in 1000 parts by volume of water and precipitated with common salt. It dyes materials of polyacrylonitrile, acid-modified polyesters and acid-modified polyamide in clear greenish yellow shades of very good fastness to light and wet processing. The dyestuff is identical with the dyestuff mentioned in the table of Example 1 which is obtained from 1,3,3-trimethyl-5-benzyloxy-2-methylene-2,3-dihydroindole-ω-aldehyde and 2-methyl-2,3-dihydroindole and has the formula

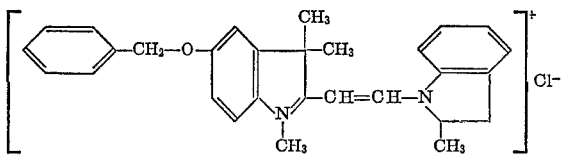

A valuable yellow dyestuff is also obtained when the 1,3,3-trimethyl-5-benzyloxy - 2 - methylene-2,3-dihydroindole is replaced with the equivalent amount of 2,3,3-trimethyl-5-benzyloxy-indolenine.

EXAMPLE 3

A fabric of polyacrylonitrile is printed with a printing paste prepared in the following way:

330 parts by weight of hot water are poured over 30 parts by weight of the dyestuff described in Example 2, 50 parts by weight thiodiethylene glycol, 30 parts by weight cyclohexanol and 30 parts by weight of 30% acetic acid, and the resultant solution is added to 500 parts by weight of crystal gum (arabic gum as thickening agent). Finally, 30 parts by weight of a zinc nitrate solution are added. The print obtained is dried, steamed for 30 minutes and subsequently rinsed. A yellow print of very good fastness properties is obtained.

EXAMPLE 4

Acid-modified polyglycol terephthalate fibres are introduced at 20° C. in a liquor ratio of 1:40 into an aqueous bath containing, per litre, 3 to 10 g. sodium sulphate, 0.1 to 1 g. oleyl polyglycol ether (50 mol ethylene oxide), 0–15 g. dimethyl-benzyl-dodecyl ammonium chloride and 0.15 g. of the dyestuff the formula of which is given in Example 1, the bath having been adjusted to pH 4 to 5 with acetic acid. The bath is heated to 100° C. within 30 minutes and kept at the same temperature for 60 minutes. The fibres are subsequently rinsed and dried. A yellow dyeing of very good fastness properties is obtained.

EXAMPLE 5

Polyacrylonitrile fibres are introduced at 40° C. in a liquor ratio of 1:40 into an aqueous bath containing, per litre, 0.75 g. of 30% acetic acid, 0.38 g. sodium acetate and 0.15 g. of the dyestuff described in Example 2. The bath is heated to boiling temperature within 20–30 minutes and kept at the same temperature for 30–60 minutes. After rinsing and drying, a yellow dyeing of very good fastness properties is obtained.

EXAMPLE 6

A stock solution is prepared from 15 parts by weight of the dyestuff mentioned in Example 2, 15 parts by weight polyacrylonitrile and 70 parts by weight dimethyl formamide, and this is added to a conventional spinning solution of polyacrylonitrile to be spun in known manner. A greenish yellow dyeing of very good fastness properties is obtained.

EXAMPLE 7

Acid-modified synthetic polyamide fibres are introduced at 40° C. in a liquor ratio of 1:40 into an aqueous bath containing, per litre, 10 g. sodium acetate, 1 to 5 g. oleyl polyglycol ether (50 mol ethylene oxide) and 0.3 g. of the dyestuff mentioned in the table of Example 1 which is prepared from 1,3,3-trimethyl-5-(p-methoxy-phenoxy)-2-methylene - 2,3 - dihydroindole-ω-aldehyde and 2-methyl-2,3-dihydroindole and corresponds to the formula

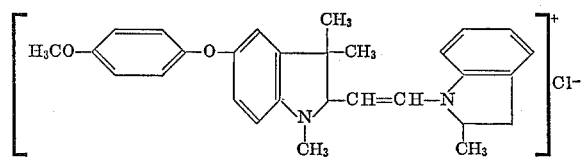

the bath having been adjusted to pH 4–5 with acetic acid. The bath is heated to 98° C. within 30 minutes and kept at the same temperature for 60 minutes. The fibres are subsequently rinsed and dried. A greenish yellow dyeing of good fastness properties is obtained.

EXAMPLE 8

Polyacrylonitrile fibres were introduced in a liquor ratio of 1:10 into a perchloroethylene bath containing, per litre, 1 g. oleic acid ethanolamide, 1 g. of the reaction product of 1 mol oleyl alcohol with 20 mol ethylene oxide, 8 g. of water and 1 g. glacial acetic acid as well as 1 g. of the dyestuff mentioned in the table of Example 1 which is prepared from 1,3,3-trimethyl-2-methylene-2,3-dihydroindole-ω-aldehyde and 4-amino - 4' - tert.-butyl-diphenyl ether and corresponds to the formula

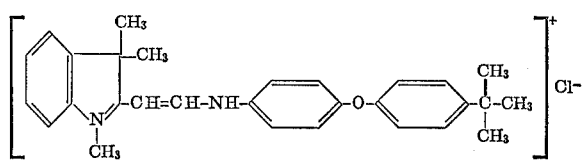

The dyebath is heated with vivid agitation of the liquor in a closed dyeing apparatus at 100° C. for 60 minutes. The fibres are subsequently rinsed and dried. A greenish yellow dyeing of very good fastness properties is obtained.

EXAMPLE 9

The dyestuff mentioned in the table of Example 1 which is obtained from 1,3,3-trimethyl-7-benzyloxy-2-methylene-2,3-dihydroindole-aldehyde and p-anisidine is converted into the dyestuff base in the usual way. 25 parts of this dyestuff base are suspended in 150 parts perchloroethylene, and 65 parts butyrolactone, and 15 parts by weight 2-ethyl-caproic acid are then added. The dyestuff dissolves with a yellow color. The solution is further stirred at 50° C. for one hour and suction-filtered after it has cooled to room temperature. A stable solution is obtained which is eminently suitable for the dyeing of polyacrylonitrile materials from solutions of chlorinated hydrocarbons.

EXAMPLE 10

50 parts of fibre yarn of anion-modified polyacrylonitrile are introduced at 22° C. into a dyebath consisting of a mixture of 4 parts of the dyestuff solution in perchloroethylene described in Example 9, 4 parts oleic acid ethanolamide, 4 parts of the reaction product of 1 mol oleyl alcohol and 20 mol ethylene oxide, 1 part glacial acetic acid and 8 parts of water in 983 parts perchloroethylene. The bath is heated with vivid circulation of the liquor to 100° C. within 30 minutes and kept at the same temperature for one hour. After this period of time, the liquor is separated and the yarn is freed from any adhering solvent in an air current. A greenish yellow dyeing is obtained.

I claim:
1. Methine dyestuff of the formula

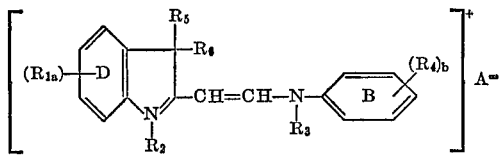

wherein $R_1$ and $R_4$ are halo, alkyl of 1–5 carbon atoms, cyclohexyl, phenylmethyl, phenylethyl, phenylpropyl-(2,2), alkoxy of 1–12 carbon atoms, nitro, carboalkoxy of 1–5 carbon atoms, cyano, acetyl, propionyl, toluyl, benzoyl, formylamino, acetylamino, n-propionylamino, benzoylamino, 4-chlorobenzoylamino, 4-methylbenzoylamino, amino, carbamoyl, N-alkylcarbamoyl of 1–4 carbon atoms in the alkyl portion, N,N-dimethylcarbamoyl, N,N-diethylcarbamoyl, N-methyl-N-ethyl-carbamoyl, N-methyl-N-phenylcarbamoyl, N-ethyl-N-phenylcarbamoyl, sulphamoyl, N-methylsulphamoyl, N-ethylsulphamoyl, N,N-dimethylsulphamoyl, N,N-diethylsulphamoyl, methylsulphonyl, ethylsulphonyl, phenylsulphonyl, trifluoromethyl, phenoxy, naphthoxy, phenylmethoxy, phenylethoxy, phenylpropyl-(2,2)-oxy, carbobenzoxy, carbo - α - phenylethyloxy, carbo-β-phenyl-ethyloxy, carbo - γ - phenyl-n-propyloxy, carboxylic acid phenyl ester, phenoxymethyl, or any of the last eleven radicals substituted in the phenyl nucleus by alkyl of 1–5 carbon atoms, halo, alkoxy of 1–4 carbon atoms, carboalkoxy of 1–5 carbon atoms, cyano, nitro, or hydroxy;

$R_4$ is halo, alkyl of 1–5 carbon atoms, cyclohexyl, phenylmethyl, phenylethyl, phenylpropyl-(2,2), alkoxy of 1–4 carbon atoms, nitro, carboalkoxy of 1–5 carbon atoms, cyano, acetyl, propionyl, toluyl, benzoyl, formylamino, acetylamino, n-propionylamino, benzoylamino, 4-chlorobenzoylamino, 4 - methylbenzoylamino, amino, carbamoyl, N-alkylcarbamoyl of 1–4 carbon atoms in the alkyl portion, N,N-diethylcarbamoyl, N-methyl-N-ethyl-carbamoyl, N-methyl-N-phenylcarbamoyl, N-ethyl-N-phenylcarbamoyl, sulphamoyl, N-methylsulphamoyl, N-ethylsulphamoyl, N,N-dimethylsulphamoyl, N,N-diethylsulphamoyl, methylsulphonyl, ethylsulphonyl, phenylsulphonyl, trifluoromethyl, alkylphenoxy of 1–5 carbon atoms in the alkyl portion, halophenoxy, alkoxyphenoxy of 1–4 carbon atoms in the alkoxy portion, carboalkoxyphenoxy of 1–5 carbon atoms in the carboalkoxy portion, cyanophenoxy, nitrophenoxy, hydroxyphenoxy, naphthoxy, phenylmethoxy, phenylethoxy, phenylpropyl-(2,2)-oxy, carbobenzoxy, carbo-α-phenylethyloxy, carbo-β-phenyl-ethyloxy, carbo-γ-phenyl-n-propyloxy, carboxylic acid phenyl ester, phenoxymethyl, or any of the last ten radicals substituted in the phenyl nucleus by alkyl of 1–5 carbon atoms, halo, alkoxy of 1–4 carbon atoms, carboalkoxy of 1–5 carbon atoms, cyano, nitro, or hydroxy;

with the proviso that at least one of $R_1$ and $R_4$ must be one of said phenoxy, naphthoxy, phenylmethoxy, phenyl-ethoxy, carbobenzoxy, carbo-α-phenylethoxy, carbo-β-phenylethyloxy, carbo-γ-phenyl-n-propyloxy, carboxylic acid phenyl ester, phenoxymethyl or their said substituted derivatives;

$R_2$ is hydrogen, alkyl of 1–5 carbon atoms, cyclohexyl, phenylmethyl, phenylethyl, phenylpropyl-(2,2), phenyl, naphthyl, methylphenyl, or chlorophenyl;

$R_3$ is hydrogen, alkyl of 1–5 carbon atoms, or alkylene when it joins ring B in the o-position to the nitrogen bond to form a closed ring;

$R_5$ and $R_6$ are alkyl of 1–5 carbon atoms, phenylmethyl, phenylethyl, phenylpropyl-(2,2), or cyclohexyl;

$a$ and $b$ are the numbers 0, 1, 2, or 3, provided that $a$ and $b$ cannot both be 0;

$A^-$ is an anion;

the rings B and D may be fused with a benzene ring; and the aromatic carbocyclic rings of the above formula may contain one or more substituents selected from the group consisting of chloro, bromo, fluoro, methyl, ethyl, methoxy, carbomethoxy, nitro, and nitrilo.

2. Methine dyestuff of the general formula

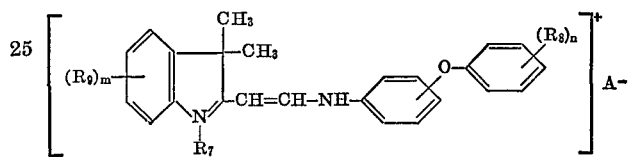

in which $R_7$ stands for methyl, ethyl or benzyl;

$R_8$ stands for identical or different methyl, ethyl, tert.-butyl, cyclohexyl, hydroxy, methoxy, ethoxy, acetylamino, nitro groups or for chloro;

$R_9$ stands for identical or different methyl, ethyl, cyclohexyl, methoxy, ethoxy, dodecyloxy, acetylamino, nitro, carbomethoxy, carboethoxy, carbamoyl, N-methyl-N-phenyl-carbamoyl, N-ethyl - N - phenyl-carbamoyl, sulphamoyl, methyl-sulphonyl, phenylsulphonyl, cyano, trifluoro methyl chloro, bromo, or fluoro;

$m$ stands for the numbers 0, 1, 2 or 3;

$n$ stands for the numbers 0, 1, 2 or 3; and $A^-$ stands for an anion.

3. Methine dystuff of the formula

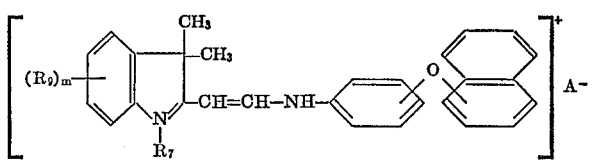

in which $R_7$, $R_9$ $m$ and $A^-$ have the same meaning as in claim 2,

4. Methine dyestuff of the formula

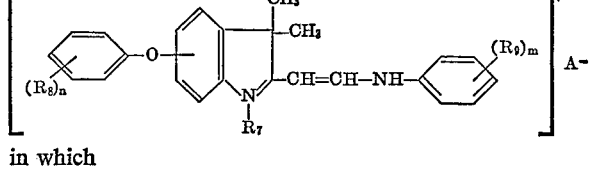

in which $R_7$, $R_8$, $R_9$, $m$, $n$, $m$ and $n$ cannot both be 0; and $A^-$ have the same meaning as in claim 2.

5. Methine dyestuff of the formula

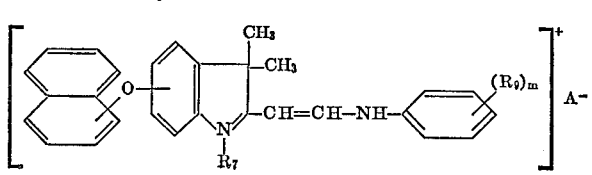

in which
R_7, R_9, $m$ and A⁻ have the same meaning as in claim 2.

6. Methine dyestuff of the formula

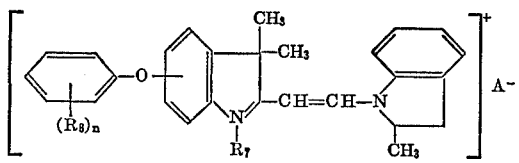

in which
R_7, R_8, $n$ and A⁻ have the same meaning as in claim 2.

7. Methine dyestuff of the formula

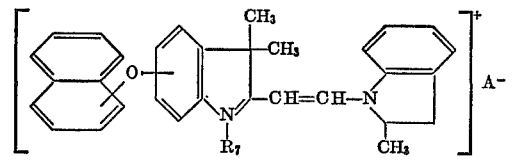

in which
R_7 and A⁻ have the same meaning as in claim 2.

8. Methine dyestuff of the formula

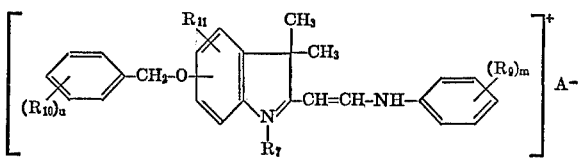

in which
R_7, R_9, $m$ and A⁻ have the same meaning as in claim 2;
R_10 means identical or different methyl or chloro;
R_11 means hydrogen, methyl, ethyl, methoxy, ethoxy or chlorine; and
$u$ means the numbers 0, 1, 2 or 3.

9. Methine dyestuff of the formula

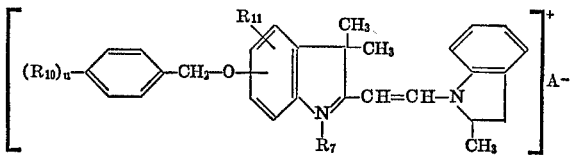

in which
R_7, R_10, R_11, $u$ and A⁻ have the same meaning as in claim 8.

10. Methine dyestuff of the formula

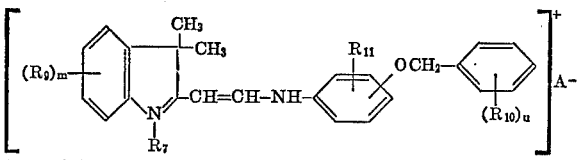

in which
R_7, R_9, R_10, R_11, $m$, $u$ and A⁻ have the same means as in claim 8.

11. Methine dyestuff of the formula

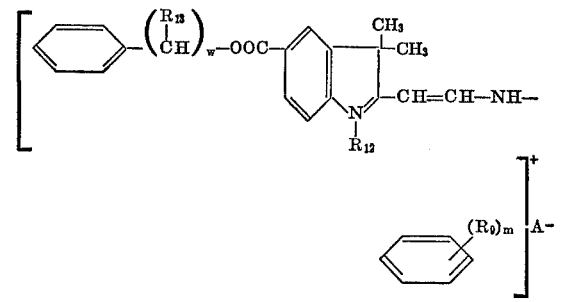

in which
R_9, $m$ and A⁻ have the same meaning as in claim 2;
R_12 means methyl or ethyl;
R_13 means hydrogen or methyl; and
$w$ means the numbers 1, 2 or 3.

12. Methine dyestuff of the formula

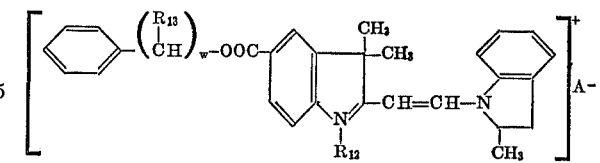

in which
R_12, R_13, A⁻ and $w$ have the same meaning as in claim 11.

13. A methine dyestuff of claim 2 of the formula

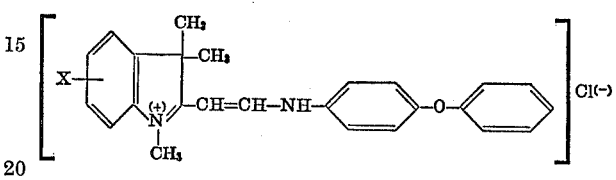

in which X stands for hydrogen, 5- or 7-methyl, 5-methoxy, 7-ethoxy, 5-carbomethoxy, 5-fluoro, 5-chloro or 5-benzyl.

14. A methine dyestuff of the formula

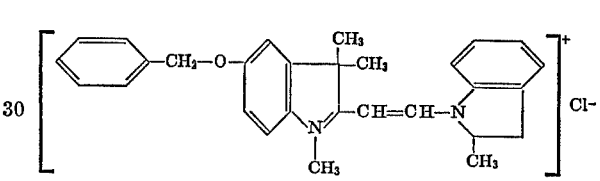

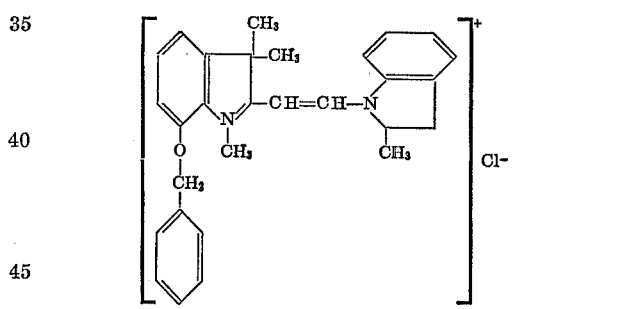

15. A methine dyestuff of the formula

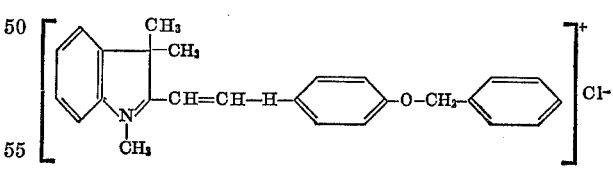

16. A methine dyestuff of claim 2 of the formula

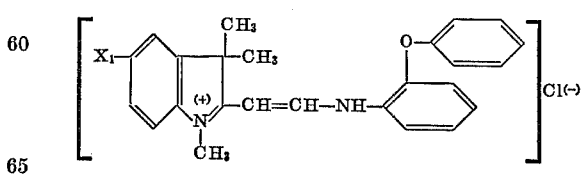

in which X_1 stands for hydrogen, chloro or carbomethoxy.

17. A methine dyestuff of claim 2 of the formula

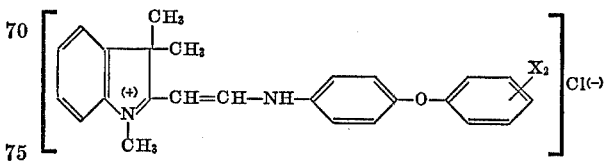

in which $X_2$ stands for 2-, 3- or 4-methyl, 4-ethyl, 4-tert-butyl, 4-cyclohexyl, 3- or 4-methoxy, 4-ethoxy, 4-acetylamino, 4-hydroxy, 4-nitro, 2-, 3- or 4-chloro or 2,3,5-trimethyl.

References Cited

UNITED STATES PATENTS

| | | | |
|---|---|---|---|
| 2,906,588 | 9/1959 | Brunkhorst et al. | 260—240.8 X |
| 3,113,825 | 12/1963 | Streck | 260—240 G |
| 3,574,200 | 4/1971 | Brack | 260—240 E |

FOREIGN PATENTS

| | | | |
|---|---|---|---|
| 206,549 | 12/1959 | Austria | 260—240 G |

JOHN D. RANDOLPH, Primary Examiner

U.S. Cl. X.R.

8—3, 12, 54.2, 177 R, 178 E, 178 R, 179; 106—22, 176; 260—326.11

UNITED STATES PATENT OFFICE
CERTIFICATE OF CORRECTION

PATENT NO. : 3,786,047
DATED : January 15, 1974
INVENTOR(S) : Hans Peter Kuhlthau It is certified that error appears in the above-identified patent and that said Letters Patent are hereby corrected as shown below:

Column 4, Line 20, in the formula, "1 0)u" should read ---(R$_{10}$)u---.

Column 4, line 52 in the formula, "CH=H-CNH-" should read ---CH=CH-NH--- .

Column 20, line 36, "groups" should be deleted.

Column 20, line 44, After "3;" insert ---m and n cannot both be 0;--- .

Column 20, Line 46, "dystuff" should read ---dyestuff--- .

Column 20, line 66, Delete "mand n cannot both be 0;"

Column 21, line 56, "means" should read ---meaning--- .

Signed and sealed this 29th day of April 1975.

(SEAL)
Attest:

RUTH C. MASON
Attesting Officer

C. MARSHALL DANN
Commissioner of Patents
and Trademarks